United States Patent
Zhu et al.

(10) Patent No.: US 9,628,521 B2
(45) Date of Patent: Apr. 18, 2017

(54) HYBRID LOCATION

(71) Applicants: Yinjun Zhu, Sammamish, WA (US); Judy Tran Ocondi, Shoreline, WA (US); Gordon Hines, Kirkland, WA (US)

(72) Inventors: Yinjun Zhu, Sammamish, WA (US); Judy Tran Ocondi, Shoreline, WA (US); Gordon Hines, Kirkland, WA (US)

(73) Assignee: Telecommunication Systems, Inc., Annapolis, MD (US)

( * ) Notice: Subject to any disclaimer, the term of this patent is extended or adjusted under 35 U.S.C. 154(b) by 86 days.

(21) Appl. No.: 14/638,617

(22) Filed: Mar. 4, 2015

(65) Prior Publication Data

US 2016/0044065 A1 Feb. 11, 2016

Related U.S. Application Data

(60) Provisional application No. 62/034,402, filed on Aug. 7, 2014.

(51) Int. Cl.
*H04B 7/00* (2006.01)
*H04L 29/06* (2006.01)
(Continued)

(52) U.S. Cl.
CPC ...... *H04L 65/1069* (2013.01); *H04L 65/1006* (2013.01); *H04M 5/12* (2013.01);
(Continued)

(58) Field of Classification Search
CPC ........ H04W 4/02; H04W 4/025; H04W 74/02
(Continued)

(56) References Cited

U.S. PATENT DOCUMENTS 7,831,216 B1 * 11/2010 Yenney ............... H04W 64/003
455/88
8,193,978 B2 * 6/2012 Moshfeghi .............. G01S 19/07
342/357.24
(Continued)

FOREIGN PATENT DOCUMENTS

WO WO 2008/027914 A2 3/2008

OTHER PUBLICATIONS

Notification of Transmittal of the International Search Report and the Written Opinion mailed May 19, 2015; International Search Report completed Apr. 29, 2015 by Authorized Officer Hornik, Valentin; Written Opinion of the International Searching Authority completed Apr. 29, 2015.

*Primary Examiner* — Dmitry H Levitan
(74) *Attorney, Agent, or Firm* — Tarolli, Sundheim, Covell & Tummino LLP

(57) ABSTRACT

A location application can be configured to detect a call to a particular telephone number. The location application can also be configured to receive a plurality of radio frequency (RF) signals provided through a plurality of different RF interfaces. Each of the RF interfaces can be configured to receive RF signals of different protocols. The location application can also be configured to determine an identifier (ID) for a source of each of the RF signals. At least two of the RF signals can be of different protocols. The location application can also be configured to insert the ID for the sources of each of the RF signals into call signaling for the call.

20 Claims, 4 Drawing Sheets

(51) Int. Cl.
*H04M 5/12* (2006.01)
*H04M 5/18* (2006.01)
*H04W 4/16* (2009.01)
*H04W 4/02* (2009.01)
*H04W 4/22* (2009.01)

(52) U.S. Cl.
CPC ............... *H04M 5/18* (2013.01); *H04W 4/02* (2013.01); *H04W 4/16* (2013.01); *H04W 4/22* (2013.01)

(58) Field of Classification Search
USPC ........ 370/310, 328, 338; 455/404, 414, 421, 455/422
See application file for complete search history.

(56) References Cited

U.S. PATENT DOCUMENTS

| | | | |
|---|---|---|---|
| 8,306,523 B2* | 11/2012 | Fischer | G01S 5/0009 379/102.01 |
| 8,340,692 B2* | 12/2012 | Skarby | G01S 5/0263 455/456.1 |
| 8,620,255 B2* | 12/2013 | Edge | H04Q 3/0045 455/404.1 |
| 8,682,321 B2 | 3/2014 | Zhu | |
| 8,923,225 B2 | 12/2014 | Sydor et al. | |
| 9,374,798 B2* | 6/2016 | Edge | H04W 64/00 |
| 2007/0082650 A1* | 4/2007 | Zhu | H04M 7/006 455/404.1 |
| 2009/0176474 A1 | 7/2009 | Bajko | |
| 2009/0189810 A1* | 7/2009 | Murray | G01S 19/48 342/357.31 |
| 2010/0135178 A1 | 6/2010 | Aggarwal et al. | |
| 2010/0323717 A1* | 12/2010 | Agashe | G01S 1/68 455/456.1 |
| 2011/0072005 A1 | 3/2011 | Vechersky | |
| 2011/0249666 A1 | 10/2011 | Holbrook et al. | |
| 2013/0122851 A1 | 5/2013 | Michaelis et al. | |
| 2013/0203376 A1 | 8/2013 | Maier et al. | |
| 2014/0171100 A1 | 6/2014 | Marti et al. | |

* cited by examiner

HYBRID LOCATION

CROSS-REFERENCE TO RELATED APPLICATION

This application claims the benefit of priority to U.S. Provisional Application No. 62/034,402, filed on Aug. 7, 2014, and entitled HYBRID LOCATION PROFILE IN SIP FOR VOICE OVER WIFI, the entirety of which is herein incorporated by reference.

TECHNICAL FIELD

This disclosure relates to an application for detecting a short code call and inserting data into signaling for the short code call.

BACKGROUND

Voice over Wireless Local Access Network (VoWLAN) is the use of a wireless broadband network according to the IEEE 802.11 standard for the purpose of vocal conversation. VoWLAN implements Voice-over-Internet-Protocol (VoIP) over a Wi-Fi network. In some examples, the Wi-Fi network and voice components supporting the voice system are privately owned. VoWLAN can be conducted over any Internet accessible end-user device, including a laptop, a personal digital assistant (PDA), a smart phone, a wearable technology device (e.g., a smartwatch) or a VoWLAN unit which functions in a manner similar to a Digital Enhanced Cordless Telecommunications (DECT) device and cellphones.

A short code, or an "N-1-1" (pronounced "N-one-one") code or number is a three-digit abbreviated dialing telephone number within the North American Numbering Plan (NANP) which allows access to specific local services, including emergency services and non-emergency services. In other regions, short codes other than N-1-1 type numbers are employed. The local services can be dispatched based on a physical location of the caller. Table 1 lists examples of uses of N-1-1 codes.

TABLE 1

| N-1-1 Code | Assignment |
| --- | --- |
| 2-1-1 | community services and information |
| 3-1-1 | municipal government services, non-emergency |
| 4-1-1 | directory assistance |
| 5-1-1 | traffic information or police non-emergency services |
| 6-1-1 | telephone company (telco) customer service and repair |
| 7-1-1 | TDD relay for the Deaf and Hard of Hearing |
| 8-1-1 | underground public utility location |
| 9-1-1 | Emergency services: Police, Fire, Ambulance |

SUMMARY

One example relates to a non-transitory machine readable medium having machine executable instructions. The machine readable instruction can include a location application being configured to detect a call to a particular telephone number and receive a plurality of radio frequency (RF) signals provided through a plurality of different RF interfaces. Each of the RF interfaces can be configured to receive RF signals of different protocols. The location application can also be configured to determine an identifier (ID) for a source of each of the RF signals. At least two of the RF signals can be of different protocols. The location application can further be configured to insert the ID for the sources of each of the RF signals into call signaling for the call.

Another example relates to a server that includes one or more computing devices. The server can be configured to receive call signaling for a short code call initiated by an end-user device that includes a plurality of radio source hardware IDs. At least two of the radio source hardware IDs can characterize RF sources that provide RF signals of different protocols. The server can further be configured to query a database to determine a location associated with the plurality of radio source hardware IDs. The server can still further be configured to determine a hybrid location of the end-user device based on the location associated with the plurality of radio source hardware IDs. The server can yet further be configured to select an endpoint for the short code call based on the determined hybrid location of the end-user device and the telephone number dialed for the short code call.

Still another example relates to a method that can include detecting, at an end-user device, a short code call. The method can also include scanning for RF signals at a plurality of different interfaces of the end-user device in response to the detecting. Each of the plurality of different interfaces can be configured to receive RF signals with different protocols. The method can further include extracting, at the end-user device, a radio source hardware ID from a plurality of RF signals detected by the scanning. The method can still further include inserting, at the end-user device, data characterizing radio source hardware IDs from at least two RF sources of different protocols into signaling for the short code call.

DETAILED DESCRIPTION

This disclosure relates to systems and method to facilitate short code calls (e.g., N-1-1 calls) from an end-user device. The end-user device can be configured to detect a short code call. The end-user device can initiate a scan for radio frequency (RF) signals at all available RF interfaces (e.g., a WiFi interface, a Bluetooth interface, a cellular interface, a satellite interface, etc.) in response to detecting the short code call. The end-user device can also extract radio source hardware identifiers (IDs) from the RF signals. The radio source hardware IDs can be inserted into call signaling for the short code call.

The call signaling can be received by a centralized call server. The centralized call server can process the signaling (including the radio source hardware IDs) to determine a physical location for the end-user device. The centralized call server can employ the determined location and the number dialed by the end-user device to select an endpoint for the short code call. Upon selection of the endpoint, the centralized call server can route the short code call to the selected endpoint.

Figure 1:
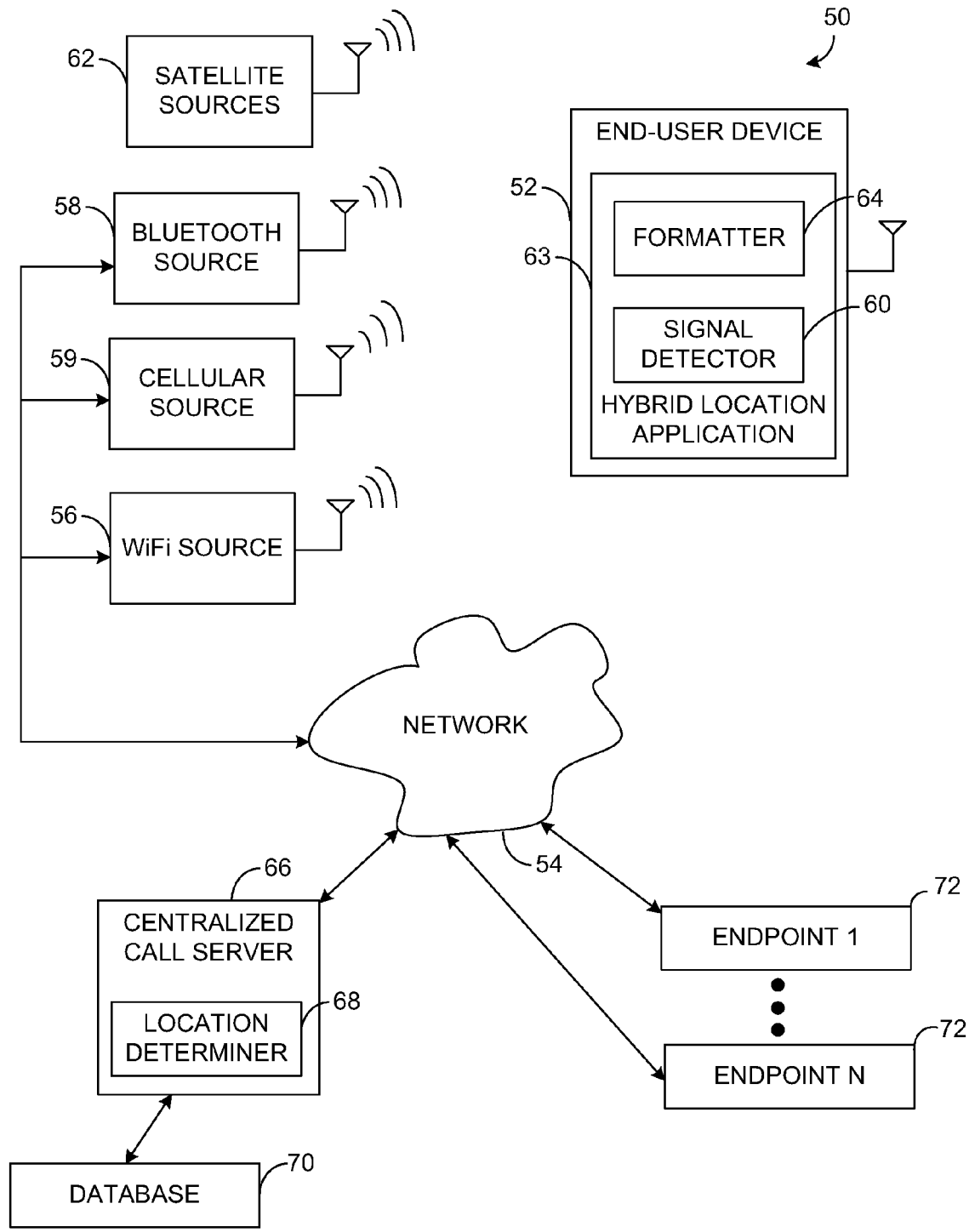
FIG. 1 illustrates an example of a system to facilitate short code calls.

FIG. 1 illustrates an example of a system 50 configured to facilitate short code calls. As used in this disclosure the term "call" refers to any form of bi-directional communication channel, including, but not limited to voice communication, video conferencing, text messaging, etc. Such calls could be, for example, Voice over Wireless Local Access Network (VoWLAN), voice over cellular calls, etc. The system 50 can include an end-user device 52 that can communicate on a network 54. The network 54 could be, for example, a public network (e.g., the Internet), a private network (e.g., a cellular network, an emergency service network, etc.) or a combination thereof. The end-user device 52 can communicate with the network 54 via a WiFi source 56 (e.g., a WiFi router), a Bluetooth source 58 (e.g., a Bluetooth hotspot), a cellular source 59 (e.g., a portal to a cellular communications network), etc. The end-user device 52 can be implemented, for example, as a mobile device, such as a smartphone, a feature phone, a laptop computer, a wearable technology device (e.g., a smart watch), a personal digital assistant (PDA), etc.

The end-user device 52 can include a hybrid location application 63 (e.g., application software) executing on the end-user device 52. The hybrid location application 63 can be configured to detect and control signaling of specific types of calls (e.g., short code calls). The hybrid location application 63 can include a signal detector 60 that can detect a call to a specific number or number type. For instance, the signal detector 60 can be configured to detect a call to a short code, such as an N-1-1 call (e.g., 9-1-1, 8-1-1, 2-1-1, 7-1-1, etc.).

In response to detecting the call, the signal detector 60 can initiate a radio discovery procedure (e.g., a scanning procedure). The radio discovery procedure can cause the end-user device 52 to scan (monitor) all available RF radio interfaces (or some subset thereof) for signals. The end-user device 52 can be configured, for example, to receive RF signals from the Bluetooth source 58 (or multiple Bluetooth sources 58), which signals can be referred to as Bluetooth signals. Additionally or alternatively, the end-user device 52 can be configured to receive RF signals from the cellular source 59 (or multiple cellular sources 59), which signals can be referred to as cellular signals. The cellular source 59 can provide, for example, a Global System for Mobile Communication (GSM) signal, a 3rd Generation Partnership Project (3GPP) Universal Mobile Telecommunications System (UMTS) signal, a 3GPP Long Term Evolution (LTE) signal, a Code Division Multiple Access (CDMA) signal, a CDMA 1× Evolution-Data Optimized (EV-DO) signal, a 4th Generation (4G) signal, a 4G LTE signal or some combination thereof. Further, the end-user device 52 can be configured to receive RF signals from the WiFi source 56 (or multiple WiFi sources 56), which can include, but is not limited to a WiFi router communicating with the end-user device 52. Such signals can be referred to as WiFi signals. In some examples, the end-user device 52 can receive RF signals from satellite sources 62, such as a Global Navigation Satellite System (GNNS). For instance, the satellite sources 62 could be Global Positioning System (GPS) satellites and/or GLONASS satellites, which RF signals can be referred to as satellite signals.

Upon detecting the RF signals, the signal detector 60 can be configured to extract (e.g., from the RF signals) an identifier (ID) for a source of the RF signals, which ID can be referred to as a radio source hardware ID. For example, in response to detecting a Bluetooth signal (or multiple Bluetooth signals), the signal detector 60 can be configured retrieve a Bluetooth ID (or other unique identifier) of the device providing the Bluetooth signal. Additionally, in response to detecting a cellular signal (or multiple cellular signals), the signal detector 60 can be configured to retrieve a Cell-ID of a cellular basestation (e.g., the cellular source 59). Still further, in response to detecting a WiFi signal (or a multiple WiFi signals), the signal detector 60 can be configured to retrieve a Media Access Control (MAC) address of a WiFi access point (e.g., the WiFi router at the WiFi source 56) providing each of the detected WiFi signals. Yet further, the signal detector 60 can record measurements for each of the satellite signals detected.

The hybrid location application 63 can include a formatter 64 configured to format the radio source hardware IDs, including the received Bluetooth ID, Cell-ID and/or MAC address for each detected signal into a format corresponding to call signaling for the short code call. Additionally, the formatter 64 can also insert detected measurements for the satellites into the signaling for the call. Moreover, in some examples, other RF signal information such as the signal strength, Time of Arrival (ToA), etc. of the WiFi, Bluetooth, cellular and/or satellite signals can be formatted using an Extensible Markup Language (XML) schema (or other schema). The formatted data can be inserted into the signaling of the call such as a Session Initiation Protocol (SIP) message, a Web Real-Time Communication (WebRTC) message, an H.323 message, a Short Message Service (SMS) message, etc. As noted the formatted data can be inserted into the signaling of the call, such as inserted into a Multi-Purpose Internet Mail Exchange Extensions (MIME) body of a payload of the call.

The signaling for the call can be received by a centralized call server 66 via the network 54. The centralized call server 66 can be representative of a server system that can handle incoming calls and/or call signaling (or other types of bi-directional communication) and route the calls to the appropriate destination in a manner described herein. The centralized call server 66 can be implemented, for example, as a cloud server system. In such a situation, features of the centralized call server 66, such as a processing unit (e.g., one or more processor cores), a network interface, memory, etc. could be representative of a single instance of hardware or multiple instances of hardware with applications executing across the multiple of instances (i.e., distributed) of hardware (e.g., computers, routers, memory, processors, or a combination thereof). Alternatively, the centralized call server 66 could be implemented on a single dedicated server.

The centralized server 66 can include (or be in communication with) a location determiner 68. The location determiner 68 can be configured to determine (or estimate) a "hybrid location" (e.g., latitude and longitude coordinates and/or a street address) of the end-user device 52, in a manner described herein. The term "hybrid location" can denote that multiple types of information (e.g., information derived from multiple formats) are employed to determine the resultant location, as described herein.

To determine the hybrid location of the end-user device 52, in some examples, the location determiner 68 can parse the call signaling and extract the identifiers and/or other RF signal information (e.g., signaling strength and/or ToA) from the call. Additionally, the location determiner 68 can access a database 70 to retrieve a location associated with each identifier included in the call signaling. For example, the location determiner 68 can query the database 70 to retrieve a location associated with each Bluetooth identifier, each MAC address identified for a WiFi source 56, each Cell-ID, etc. In some situations, the database 70 can be representative of multiple databases that stores location information for a specific type of identifier.

Further, in some examples, the location determiner 68 can process recorded satellite signals from the call signaling. In such a situation, the location determiner 68 can employ algorithms (e.g., GPS algorithms) to derive a triangulated location for the end-user device 52 based on the recorded satellite signals. Additionally or alternatively, in some examples, where the location of three terrestrial (or more) devices (e.g., a combination or multiple instances of each of the Bluetooth source 58, the cellular source 59 and the WiFi source 56) is known, the triangulated position can also be calculated based on RF signals received from the three or more terrestrial devices.

Upon determining the location of each Bluetooth source 58, a location corresponding to the Cell-ID, a location corresponding to each MAC address for a WiFi source 56 and a location based on triangulation of satellite and/or terrestrial signals, the location determiner 68 can employ a weighted analysis or other computer learning technique to determine a location of the end-user device 52, which can be referred to as the hybrid location for the end-user device 52. As noted, the hybrid location can be represented as latitude and longitude coordinates and/or a street address for the end-user device 52. The weighted analysis and/or other learning technique can be based on the location of the identified devices, the recorded signal strengths and ToA and/or the triangulated location of the end-user device 52. In some examples, the information such as the WiFi and/or Bluetooth signal strengths and/or the triangulated position can facilitate advanced hybrid positioning methods such that the hybrid location determined for the end-user device 52 can be highly accurate.

In some examples, the centralized call server 66 can receive location information from the end-user device 52 in the call signaling. The location information (e.g., latitude and longitude coordinates) can characterize a location associated with an Internet Protocol (IP) address of the end-user device 52 or the location information can correspond to a triangulated location calculated by the end-user device 52. Such calculation can be based, for example, on a triangulation of satellite signals and/or cellular signals. In such a situation, the centralized call server 66 can compare the location information provided by then end-user device 52 to locations of each Bluetooth source 58 and/or the location of each WiFi source 56 to verify a validity and/or accuracy of the location information. For example, if it is determined that the location characterized in the location information provided from the end-user device 52 is relatively close to the location of each Bluetooth source 58 and/or each WiFi source 56, it can be presumed that the location information is valid and the location characterized in the location information can be employed as the hybrid location of the end-user device 52. Alternatively, if it is determined that the location characterized in the location information provided from the end-user device 52 is relatively far from the location of each Bluetooth source 58 and/or each WiFi source 56, it can be presumed that the location information is not valid, and the hybrid location of the end-user device 52 can be determined in the manner described.

Moreover, in some situations, the hybrid location of the end-user device 52 can be employed to update the database 70. For instance, in a situation where two WiFi signals and corresponding MAC addresses are received in the call signaling, and but the location for only one such WiFi source 56 is known, the location determiner 68 can update the database 70 to provide a location for the other WiFi source 56. A location for Bluetooth sources 58 can additionally or alternatively be determined in a similar manner.

Upon determining the hybrid location of the end-user device 52, the centralized call server 66 can be configured to select an endpoint 72 from N number of endpoints 72, where N is an integer greater than or equal to one. Each endpoint 72 can be implemented, for example, as a Public-Safety Answering Point (PSAP), a call center, a business, a service department, another end-user device, etc. The selection of the selected endpoint 72 can be based on the hybrid location determined for the end-user device 52 and the number dialed at the end-user device 52. For instance, if the call is a 9-1-1 call, the selected endpoint 72 could be a PSAP assigned to service emergency calls in the vicinity of the hybrid location determined for the end-user device 52. Alternatively, if the call is a 3-1-1 call, the selected endpoint 72 could be a governmental services department that can dispatch services the vicinity of the end-user device 52.

In some examples, the centralized call center 66 can be configured to directly connect the call to the selected endpoint 72. In other examples, the centralized call server 66 can provide routing instructions (e.g. commands) to nodes on the network 54 (e.g., in a carrier network) associated with the end-user device 52 that can cause software switches of the network 54 to connect the call to the selected endpoint 72. Additionally, the hybrid location determined for the end-user device 52 can also be provided to the selected endpoint 72, either as part of the signaling of the routed call, or in a separate message.

In some instances, the location receivable by the selected endpoint 72 may be limited to a particular format. For example, some of the N number of endpoints 72 may only be able to receive a Cell-ID. In such a situation, a Cell-ID can be derived for the end-user device 52 even if no Cell-ID is provided in the call signaling. For instance, upon determining that the selected endpoint 72 can only receive a Cell-ID, the location determiner 68 can access the database 70 to determine a Cell-ID for the location determined for the end-user device 52 (e.g., via a reverse GIS lookup). In this manner, call handling features, such as billing based on Cell-ID, call routing based on Cell-ID, call tracing, call records, etc. implemented by the selected endpoint 72 can be supported over a resulting connection.

By employment of the system 50, the hybrid location of the end-user device 52 can be determined with a relatively high-degree of accuracy. Moreover, the hybrid location of the end-user device 52 can be determined in situations where a satellite is not visible from a position of the end-user device 52 (e.g., indoors). Further, as many end-user devices 52 are mobile devices (e.g., phones), the telephone number assigned to the end-user device 52 does not necessarily provide location information that can be relied on. Additionally, since the formatted data can be inserted into the call signaling, location requests in response to an incoming call do not need to be provided to the end-user device 52, thereby increasing the speed and efficiency of selecting the selected endpoint 72.

Figure 2:
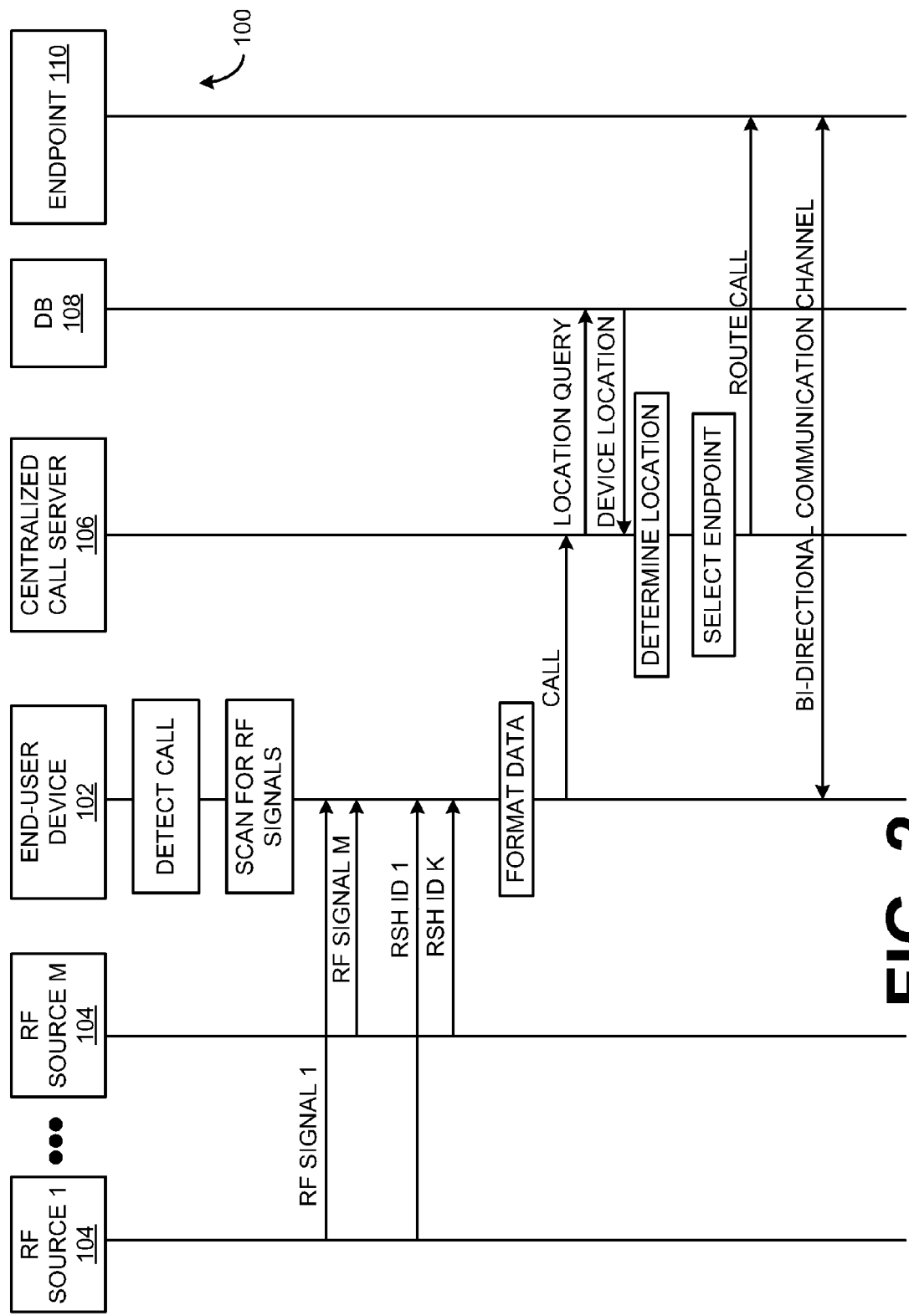
FIG. 2 illustrates an example of a system workflow diagram to facilitate short code calls.

FIG. 2 illustrates an example of a system workflow diagram 100 that facilitates voice calls or other bi-directional communication. The system workflow diagram 100 includes nodes that can communicate over a network, such as the network 54 illustrated in FIG. 1. In the system flow diagram 100 includes an end-user device 102. The end-user device 102 can be implemented, for example, as a mobile device, such as a smart phone, a feature phone, a tablet computer, a laptop computer, a wearable technology device (e.g., a smartwatch), etc. The end-user device 102 can be configured to detect a call (e.g., a request to establish bidirectional communication) to a specific number of a set of numbers. As described herein, the detected call is directed to a short code, such as an N-1-1 number, but in other examples, other types of number could be employed.

In response to detecting the call to the specific number, the end-user device 102 can scan for RF signals. The end-user device 102 can receive M number of RF signals (labeled in FIG. 2 as "RF SIGNAL 1" . . . "RF SIGNAL M") from M number of RF sources 104, where M is an integer greater than or equal to one. Each of the RF sources 104 could be implemented, for example, as a WiFi source (e.g., the WiFi source 56 of FIG. 1), a Bluetooth source (e.g., the Bluetooth source 58 of FIG. 1), a cellular source (e.g., the cellular source 59 of FIG. 1) a satellite source (e.g., the satellite source 62 of FIG. 1), etc. In some instances, an RF signal can be recorded, such as in situations where the RF signal is a satellite signal. Additionally, the end-user device 102 can determine radio source hardware IDs 102 (labeled in FIG. 2 as "RSH ID 1" . . . "RSH ID K") for K number of the RF sources 104, where K is an integer greater than or equal to one. In some examples, the RF signals can include data that characterizes the radio source hardware ID. In some situations, the end-user device 102 may only receive a subset of radio source hardware IDs from the M number of RF sources 104. Additionally, in some examples, the end-user device 102 can query a particular RF source 104 for the radio source hardware ID, and the radio source hardware ID can be provided from the particular RF source 104 to the end-user device 102 in response to the query.

Each radio source hardware ID could be a MAC address from a WiFi source, a Bluetooth ID from a Bluetooth source, a Cell-ID from a cellular source, etc. Upon receiving the K number of radio source hardware IDs, the end-user device 102 can format data that includes the radio source hardware IDs and/or recorded for the detected RF sources 104. The data can be formatted, for example, into a format readable by a centralized call server 106 (e.g., XML). Additionally, the formatted data can be inserted into a SIP message and included in the signaling of the call.

Upon inserting the data, the end-user device 102 can initiate the short code call (labeled in FIG. 2 as "CALL") such that the signaling can be provided to a centralized call server 106. The centralized call server 106 can be implemented, for example, in a manner similar to the centralized call server 66 illustrated in FIG. 1. In some examples, the centralized call server 66 and the end-user device 102 can communicate through a public network (e.g., the Internet, the Public Switched Telephone Network (PTSN)), a private network (e.g., a cellular communications network) or a combination thereof. It is noted that some of the functions performed on the centralized call server 106 can be performed on external systems (e.g., other servers in a server farm) that communicate with the centralized call server 106.

The centralized call center 106 can extract the data included in the signaling of the call. The centralized call server 106 can initiate a location query (labeled in FIG. 2 as "LOCATION QUERY") to a database 108. The database 108 can be implemented, for example, in a manner similar to the database 70 illustrated in FIG. 1. The location query can, for example, be a query to the database 108 for a location associated with the radio source hardware IDs included in the call signaling. In response, the database 108 can provide the location corresponding to each of the K number of radio source hardware IDs or some subset thereof.

The centralized call server 106 can determine a hybrid location for the end-user device 102 based on the data returned by the database 108 and/or the data included in the signaling of the call. In some examples, the hybrid location can be based on a triangulation of signals recorded and inserted into the call signaling. The hybrid location determined for the end-user device 102 can be latitude longitude coordinates, a street address, etc. Additionally or alternatively, the centralized call server 106 can analyze additional information included in the signaling of the call (e.g., ToA, signal strength, etc.) for some or all of the detected RF signals to determine the most likely location for the end-user device 102. In some situations, it is possible that there are two or more possible (conflicting) locations for the end-user device 102. In these situations, the centralized call center 106 can arbitrate between the conflicting locations based on a weighted analysis of the reliability of each conflicting location. Further, in some examples, upon determining the hybrid location of the end-user device 102, the centralized call server 106 can write updates to the database 108 to add and/or update locations for particular radio source hardware IDs. In some examples, some or all of the operations for determining the hybrid location (including, but not limited to the triangulation of signals) of the end-user device 102 can be performed by an external system, such as a location server and/or another computing device. It is to be understood that the centralized call server 106 can include multiple servers that cooperate to perform the functions described herein.

Based on the hybrid location determined for the end-user device 102 and the number dialed for the call, the centralized call server 106 can select an endpoint 110 to handle the services needed for the call. The endpoint 110 can be implemented, for example, in a manner similar to one of the N number of endpoints 72 of FIG. 1.

Upon selecting the endpoint 110, the centralized call server 106 can cause the call to be routed to the endpoint 110 (labeled in FIG. 2 as "ROUTE CALL"). In some examples, the centralized call server 106 can route (e.g., transfer) the call directly to the endpoint 110. In other examples, the centralized call server 106 can provide instructions (e.g., commands) to another node on a network associated with the end-user device 102 (e.g., a carrier network) for routing the call to the endpoint 110.

In some situations, the call routing can include signaling or a separate message that includes data characterizing the hybrid location determined for the end-user device 102. Moreover, in some situations, the endpoint 110 may only be able to accept a cell-ID as a location for the end-user device 102. In such situations, the centralized call server 106 can perform a reverse lookup to determine a cell-ID for the end-user device 102 based on the hybrid location determined for the end-user device 102. Upon completing the call routing, a bi-directional communication channel (labeled in FIG. 2 as "BI-DIRECTIONAL COMMUNICATION CHANNEL") can be established between the end-user device 102 and the endpoint 110.

As illustrated and described, the system workflow diagram 100 allows any RF signal detectable by the end-user device 102 to be leveraged to determine the hybrid location for the end-user device 102. In this manner, the hybrid location determined for the end-user device 102 can be highly accurate, even in situations where the end-user device 102 is indoors such that no satellites are visible and/or the end-user device 102 is communicating via WiFi or Bluetooth (e.g., VoWLAN).

Figure 3:
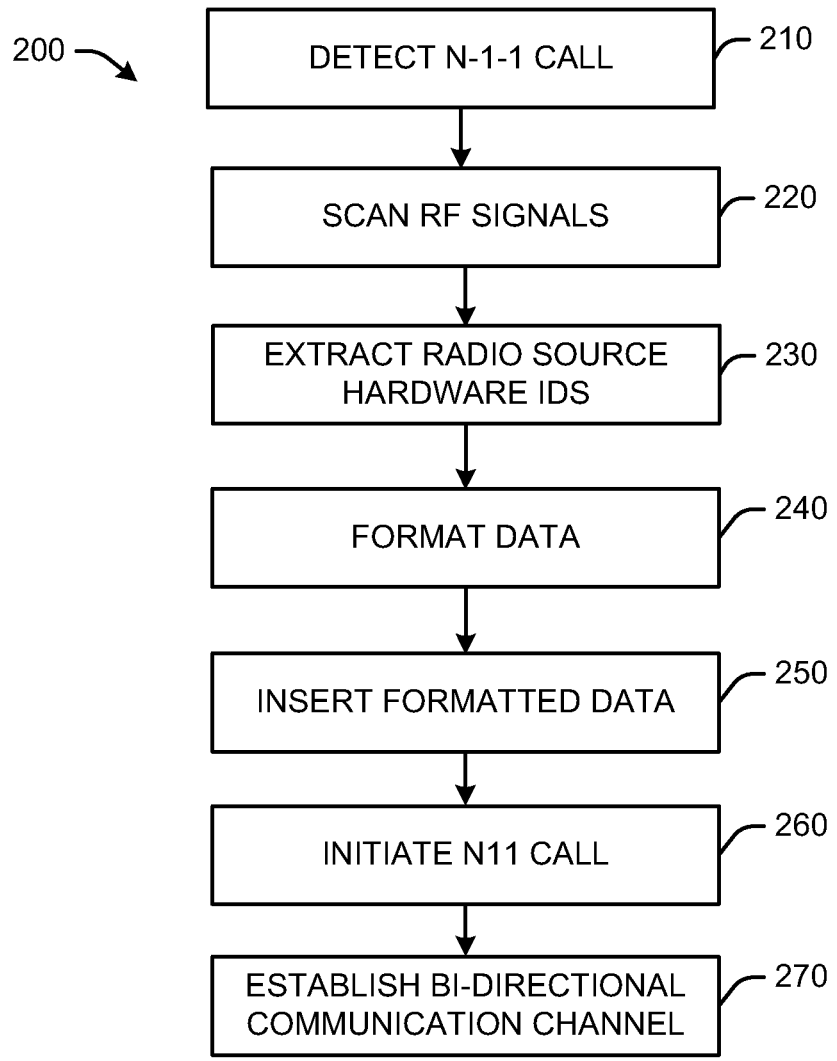
FIG. 3 illustrates a flowchart of an example of a method for initiating a short code call.
Figure 4:
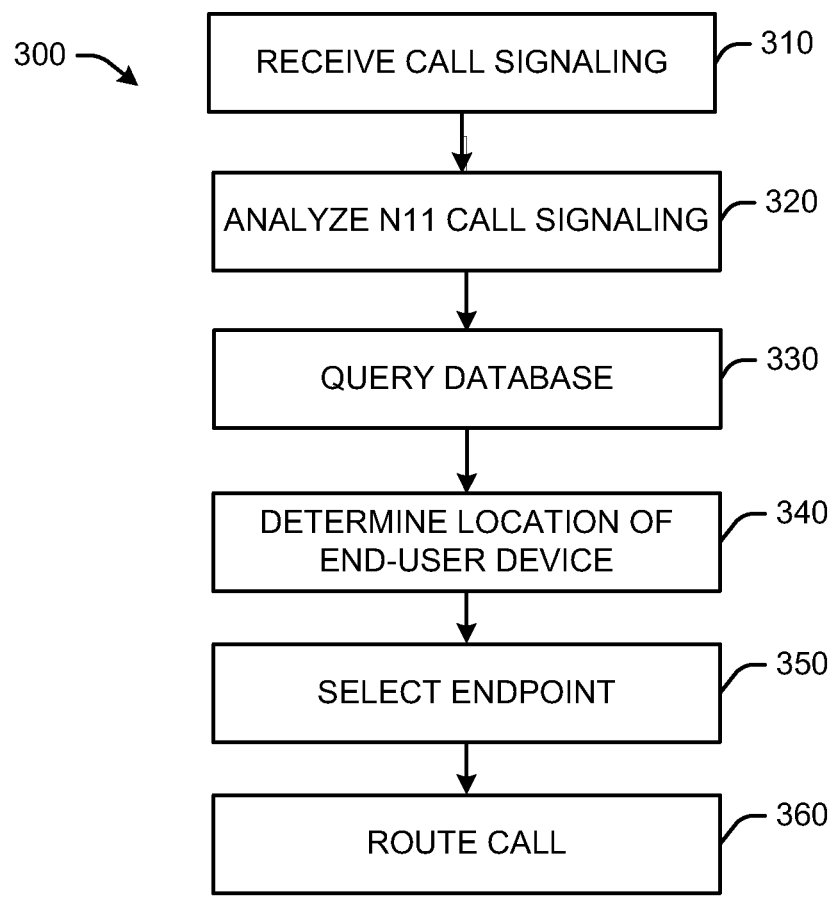
FIG. 4 illustrates a flowchart of an example of a method for processing a short code call.

In view of the foregoing structural and functional features described above, example methods will be better appreciated with reference to FIGS. 3 and 4. While, for purposes of simplicity of explanation, the example methods of FIGS. 3. and 4 are shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method. The example methods of FIGS. 3 and 4 can be implemented as instructions stored in a non-transitory machine-readable medium. The instructions can be accessed by a processing resource (e.g., one or more processor cores) and executed to perform the methods disclosed herein.

FIG. 3 illustrates an example flowchart of a method 200 of initiating a short code call (e.g., an N-1-1 call). The method 200 can be implemented, for example, by an end-user device, such as the end-user device 52 illustrated in FIG. 1. At 210, the end-user device can detect a call or other bidirectional communication to an N-1-1 service. At 220, the end-user device can scan for RF signals in response to detecting the short code call. The scan for RF signals can be performed at all protocols receivable by the end-user device (or some subset thereof). Information characterizing the RF signals (e.g., signal strength ToA, etc.) detected can be stored by the end-user device.

At 230, in response to detecting the RF signals via the scan, the end-user device can extract a radio source hardware ID from the RF signals. Alternatively, in some examples, the end-user device can query a particular source of an RF signal for the radio source hardware ID. At 240, data such as the received radio source hardware IDs and the other RF information can be formatted into a format usable by a centralized call server (e.g., XML). At 250, the formatted data can be inserted into call signaling (e.g., as a SIP message). Accordingly, the signaling can include, for example, the radio source hardware IDs received and or the RF signal information stored at the end-user device.

At 260, the short code call that includes the signaling can be initiated. The signaling for the short code call can be directed to a centralized call server, such as the centralized call server 106. At 270, the end-user device can establish a bi-directional communication channel (e.g., a voice channel, a video channel and/or a text channel) with an endpoint, such as one of the N number of endpoints 72 illustrated in FIG. 1. Such a bi-directional communication channel can be employed to satisfy the short code call.

FIG. 4 illustrates an example flowchart of a method 300 of processing a short code call. The method 300 can be implemented, for example, by a centralized call server, such as the centralized call server 66 of FIG. 1. At 310, the centralized call server can receive call signaling for a short code call from an end-user device, such as the end-user device 52 illustrated in FIG. 1.

At 320, the short code call signaling can be analyzed by the centralized call server. The call signaling can include, for example, a plurality of radio source hardware IDs and/or other RF information (e.g., ToA, signal strength, recorded data, etc.) that characterize RF signal scanned by the end-user device. At 330, the centralized call server can query a database for a location corresponding to the radio source hardware IDs included in the call signaling of the short code call. At 340, the location corresponding to each radio source hardware ID (or some subset thereof) and the other RF information can be analyzed by the centralized call server to determine a hybrid location for the end-user device.

At 350, an endpoint (e.g., one of the N number of endpoints 72 illustrated in FIG. 1) can be selected for the short code call. The selection can be based, for example, on the particular number (e.g. N-1-1 number) dialed and the hybrid location determined for the end-user device. At 360, the short code call can be routed to the selected endpoint in a manner described herein, thereby establishing bi-directional communication between the selected endpoint end the end-user device.

In view of the foregoing structural and functional description, those skilled in the art will appreciate that portions of the systems and method disclosed herein may be embodied as a method, data processing system, or computer program product such as a non-transitory computer readable medium. Accordingly, these portions of the approach disclosed herein may take the form of an entirely hardware embodiment, an entirely software embodiment (e.g., in a non-transitory machine readable medium), or an embodiment combining software and hardware. Furthermore, portions of the systems and method disclosed herein may be a computer program product on a computer-usable storage medium having computer readable program code on the medium. Any suitable computer-readable medium may be utilized including, but not limited to, static and dynamic storage devices, hard disks, optical storage devices, and magnetic storage devices.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processors of a general purpose computer, special purpose computer, or other programmable data processing apparatus (or a combination of devices and circuits) to produce a machine, such that the instructions, which execute via the one or more processors, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

What have been described above are examples. It is, of course, not possible to describe every conceivable combination of structures, components, or methods, but one of ordinary skill in the art will recognize that many further combinations and permutations are possible. Accordingly, the invention is intended to embrace all such alterations, modifications, and variations that fall within the scope of this application, including the appended claims. Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A non-transitory machine readable medium having machine executable instructions comprising an application being configured to:
    detect, at an end-user device, a call to a particular telephone number based on user-input at the end-user device;
    receive, at the end-user device, a plurality of radio frequency (RF) signals provided by a plurality of RF sources via a plurality of different RF interfaces of the end-user device in response to detecting the call at the end-user device, wherein each of the RF interfaces is configured to receive RF signals of different protocols;
    determine, at the end-user device, an identifier (ID) for a source of each of the RF signals, wherein at least two of the RF signals are of different protocols; and
    insert, at the end-user device, the ID for the sources of each of the RF signals into call signaling for the call.

2. The medium of claim 1, wherein the call is a short code call.

3. The medium of claim 2, wherein a given one of the plurality of RF sources is a WiFi source and another one of the plurality of RF sources is a Bluetooth source.

4. The medium of claim 3, wherein one of the plurality of RF signals received is provided from a satellite source.

5. The medium of claim 4, wherein one of the plurality of RF signals received is provided from a cellular source.

6. The medium of claim 1, wherein the location application is further configured to provide the signaling for the call to a centralized call server.

7. The medium of claim 1, wherein the call signaling includes RF information characterizing a subset of the plurality of RF signals received.

8. The medium of claim 7, wherein the RF information characterizes a signal strength for the subset of the plurality of RF signals received.

9. The medium of claim 7, wherein the RF information characterizes a time of arrival for the subset of the plurality of RF signals received.

10. The medium of claim 1, wherein the ID for the source of each of the RF signals is inserted into a Session Initiated Protocol (SIP) message.

11. A server comprising one or more computing devices, the server being configured to:
    receive call signaling for a short code call initiated by an end-user device that includes a plurality of radio source hardware identifiers (IDs) inserted, at the end-user device, based on data extracted from a plurality of radio frequency (RF) signals having different protocols, wherein at least two of the radio source hardware IDs characterize radio frequency (RF) sources that provide RF signals;
    query a database to determine a location associated with the plurality of radio source hardware IDs;
    determine a location of the end-user device based on the location associated with the plurality of radio source hardware IDs; and
    select an endpoint for the short code call based on the determined location of the end-user device and a telephone number dialed to initiate short code call.

12. The server of claim 11, wherein the server is further configured to facilitate routing of the short code call to the selected endpoint to establish a bi-directional communication channel between the end-user device and the selected endpoint.

13. The server of claim 12, wherein the server is further configured to provide the determined location for the end-user device to the selected endpoint.

14. The server of claim 12, wherein the server is further configured to generate instructions for a network node to complete the routing of the short code call to the selected endpoint.

15. The server of claim 11, wherein the server is further configured to determine a cell-ID for the end-user device based on the determined location of the end-user device.

16. The server of claim 11, wherein the server is configured to write a location for a given radio source hardware ID of the plurality of radio source hardware IOs into the database based on the location associated with another radio source hardware ID.

17. The server of claim 11, wherein the determination of the location of the end-user device is also based on RF signal information provided from the end-user device.

18. The server of claim 11, wherein the RF signal information characterizes at least one of an RF signal strength and a time of arrival of an RF signal.

19. A method comprising:
    detecting, at an end-user device, a short code call based on user-input at the end-user device;
    scanning, at the end-user device, for radio frequency (RF) signals at a plurality of different interfaces of the end-user device in response to the detecting, wherein each of the plurality of different interfaces is configured to receive RF signals with different protocols;
    extracting, at the end-user device, a radio source hardware identifier (ID) from each of a plurality of RF signals detected by the scanning; and
    inserting, at the end-user device, data characterizing each radio source hardware ID from at least two RF sources of different protocols into signaling for the short code call.

20. The method of claim 19, further comprising establishing, at the end-user device, a bi-directional communication channel between an endpoint and the end-user device.

* * * * *